United States Patent
Park

(10) Patent No.: US 9,776,505 B2
(45) Date of Patent: Oct. 3, 2017

(54) FUEL INJECTION HOLE CAP FOR PREVENTING EXPLOSION DUE TO STATIC ELECTRICITY

(71) Applicant: Chang Hee Park, Seoul (KR)

(72) Inventor: Chang Hee Park, Seoul (KR)

( * ) Notice: Subject to any disclaimer, the term of this patent is extended or adjusted under 35 U.S.C. 154(b) by 411 days.

(21) Appl. No.: 14/627,359

(22) Filed: Feb. 20, 2015

(65) Prior Publication Data
US 2015/0239341 A1    Aug. 27, 2015

(30) Foreign Application Priority Data
Feb. 27, 2014  (KR) .................. 10-2014-0023416

(51) Int. Cl.
| | | |
|---|---|---|
| *B64D 45/02* | (2006.01) | |
| *F16L 25/01* | (2006.01) | |
| *B64D 37/32* | (2006.01) | |
| *B60K 15/04* | (2006.01) | |
| *B60K 15/03* | (2006.01) | |

(52) U.S. Cl.
CPC ..... *B60K 15/0406* (2013.01); *B60K 2015/03401* (2013.01)

(58) Field of Classification Search
CPC ......... B64D 45/02; B64D 37/32; F16L 25/01; B67D 7/3236
USPC ........................................................ 36/215
See application file for complete search history.

(56) References Cited

U.S. PATENT DOCUMENTS

| | | | | |
|---|---|---|---|---|
| 5,898,560 A | * | 4/1999 | Flaynik, Jr. ............ | B01D 35/02 |
| | | | | 361/212 |
| 6,283,320 B1 | * | 9/2001 | Patch ................... | B67D 7/3236 |
| | | | | 215/386 |
| 6,655,424 B2 | * | 12/2003 | Kawazu ................ | B60K 15/04 |
| | | | | 141/83 |
| 7,715,169 B2 | * | 5/2010 | Mathison ............... | B60K 15/04 |
| | | | | 361/215 |

FOREIGN PATENT DOCUMENTS

| | | |
|---|---|---|
| JP | 2003-267073 A | 9/2003 |
| KR | 10-2006-0040955 A | 5/2006 |

OTHER PUBLICATIONS

Korean Publication No. 10-2006-0040955, Fuel Injectin hole structur for preventing fire, Drawings, and Speciification.*
JPA-2003-267073; Sep. 25, 2003, Entire Drawings, specificatin and claims.*

* cited by examiner

*Primary Examiner* — Dharti Patel
(74) *Attorney, Agent, or Firm* — Birch, Stewart, Kolasch & Birch, LLP

(57) ABSTRACT

Disclosed is a fuel injection hole cap for preventing explosion due to static electricity which is characterized in that it is possible to prevent any fire due to an explosion of fuel evaporation gas in such a way to instantly discharge static electricity the instant that a user touches with a hand injection hole cap before the fuel injection hole cap is opened, without carrying any device with him which is configured to prevent the occurrence of static electricity. For this, at the fuel injection hole cap of a vehicle, there is provided a static electricity discharger which is configured to discharge static electricity and flash by the current of the discharging, thus informing the use of the discharging.

2 Claims, 3 Drawing Sheets

FUEL INJECTION HOLE CAP FOR PREVENTING EXPLOSION DUE TO STATIC ELECTRICITY

TECHNICAL FIELD

The present invention relates to a fuel injection hole cap structure for preventing fire due to static electricity, and in particular to a fuel injection hole cap for preventing fire due to static electricity which makes it possible to prevent any fire due to the explosion of fuel evaporation gas which may be present inside of a fuel tank and a fuel injection hole when a spark occurs due to static electricity in the middle of opening or closing a fuel injection hole cap of a vehicle (in particular a gasoline vehicle).

BACKGROUND ART

In general, a fuel evaporation gas vaporizing from a gasoline fuel which is used as the fuel of a vehicle internal combustion engine may easily combust when it is exposed to static electricity or spark. A gasoline evaporation gas may be present inside of a fuel tank and a fuel injection tube since a gasoline fuel fluctuates in a fuel tank, causing the fuel to vaporize, when it is a high temperature or while a vehicle drives.

Since the fuel evaporation gas has a high flammability, even a small flame may react with surrounding oxygen and may combust like an explosion, for which the engine of a vehicle should be shut off during the fueling in order to keep away from any flame causing elements. Despite the above facts, there may be a fire due to the explosion of a gasoline gas inside of a fuel injection hole due to a static electricity or a spark which may occur in the middle of opening a fuel injection hole cap when lubricating a vehicle.

In order to prevent any explosion of a fuel evaporation gas due to a static electricity, the Korean Patent Publication No. 10-2006-0040955 (the title of the invention: fuel injection hole structure for preventing fire) describes that since a gasoline gas (fuel evaporation gas) present inside of a fuel injection hole in the middle of opening a fuel injection hole cap of a vehicle automatically emits to the outside of the fuel injection hole, it is possible to prevent any explosion of a gasoline gas due to a static electricity or a spark and any fire due to the explosion which may occur in the middle of opening a fuel injection hole cap.

FIG. 1 is a view illustrating a prior art. In a fuel injection hole structure for a vehicle which is opened or closed by a fuel injection hole cap 10, an auxiliary cap 14 with a diameter similar with the diameter of a fuel injection hole 12 is connected using a vertical bar 16 to the bottom of the fuel injection hole cap 10, and a plurality of discharge ports 20 are formed at an inner diameter surface of the fuel injection hole 12, and two rows of opening and closing plates 18 which are opened due to the ascending and descending operations of the auxiliary cap 14 are engaged to the discharge port 20. For the sake of fueling, when rotating open the fuel injection hole cap 10, the surrounding surface of the auxiliary rap 14 pushes in sequence the two upper and lower rows of the opening and closing plates 18, and at the same time the bottoms of the two upper and lower rows of the opening and closing plates 18 are opened in sequence about the rotation point of a hinge spring 22. The two upper and lower rows of the discharge ports 20 are opened toward the outside, so the gasoline gas present inside of the fuel injection hole 12 may easily emit through the two upper and lower rows of the discharge ports 20, thus preventing any explosion and fire even when a static electricity or a spark occurs.

However, the above prior art is directed to a way of previously removing to the outside the fuel evaporation gas present inside of the fuel tank when opening the fuel injection hole cap; however if a spark occurs by a static electricity when a user opens the fuel injection hole cap, the emitting fuel evaporation gas may be ignited, which may cause fire. In addition, if the fuel tank is filled full, fuel may leak through a discharge port 20 dedicated to the emission of the fuel evaporation gas (gasoline gas).

Given the above mentioned problems, as illustrated in FIG. 2, the users who try to previously prevent any occurrence of such static electricity always carry a static electricity discharge device (static electricity discharger) formed in a shape of a portable key ring (discharger made of diode, neon light or fiber with high conductivity) with them and use them when lubricating.

The conventional vehicle static electricity discharge device designed for the above-mentioned purposes is made in a portable key ring shape wherein the components of static electricity discharge devices may be directly provided at a vehicle key, etc. or as illustrated in FIG. 2, the static electricity discharge device 30 may be made in a shape of a portable decoration item. When a user touches a static electricity discharge circuit contact unit 31 made of a metallic material with a metallic conductive portion of an electronic appliance, a vehicle, etc., the static electricity accumulated in the body flows through the static electricity discharge circuit contact unit 31—a conductive wire 33—a metallic conductive unit 32—a vehicle body (metallic conductive material) and to the ground, thus discharging. At this time, the diode 34 or the neon light designed for the user to check out whether or not the static electricity is discharged may be provided at an intermediate portion of the conductive wire 33, so when the static electricity flows to the ground, the diode 34 may turned on/off, generating flash, which helps the user to check that it is safe to use.

Since the portable static electricity prevention device in general is kept in a user's pocket of a clothes or in a handbag and is taken out when in use, the user should always be aware of the discharge of the static electricity, otherwise, it is hard for the user to use such a device by taking out for each situation. Once the user forgets the use of the device, a big disaster may take place because of static electricity. Therefore, the above-described conventional device is not enough to be used for the sake of a reliable static electricity prevention means.

PRIOR ART DOCUMENT

Patent Document

Korean Patent Publication No. 10-2006-0040955 (Title of the invention: fuel injection hole structure for preventing fire)

DISCLOSURE OF THE INVENTION

Accordingly, it is an object of the present invention to provide a fuel injection hole cap which is characterized in that it is possible to prevent the occurrence of fire due to the explosion evaporation gas in such a way to discharge static electricity the instant that a user touches a fuel injection hole cap before the fuel injection hole cap is opened, without carrying with him any device which is designed to prevent the occurrence of the static electricity. In particular, the discharged state of the static electricity may be visually checked, thus removing any psychological anxiety of the user, which may lead to the promotion of self-fueling.

To achieve the above objects, there is provided a fuel injection hole cap for preventing explosion due to static electricity, which opens and closes a fuel injection hole for injecting fuel into a fuel tank of a vehicle, which may include a handle unit which is configured to pop up above a surface of a vehicle body for rotating open the fuel injection hole cap; a static electricity discharger a part of a body of which is buried in order for the static electricity accumulated in a user's body to flow and be discharged when a user's hand touches at least a surface of the handle unit; and a ground wire which extends from the static electricity discharger in order for the current of the static electricity flowing from the user's body and the static electricity discharger to be guided to a vehicle body panel and to be discharged, wherein a free end thereof keeps contacted with a vehicle body panel of a fuel injection hole cap protection compartment, and wherein the static electricity discharger may include a visible pipe unit through which light passes; a static electricity discharge circuit contact unit and a metallic conductive unit which cover both ends of the visible pipe unit; and a lighting unit which is disposed inside of the visible pipe unit and is configured to instantly flash by the current of the static electricity so that the user can visually recognize the discharged state when the current static electricity flows to the ground wire when the user touches the handle unit and contacts the static electricity discharge circuit contact unit.

The ground wire is made from an elastic metallic wire.

Advantageous Effects

A typical static electricity discharger that a user with a physical characteristic of easily causing static electricity carries all the time is buried under the surface of a fuel injection hole cap of where a user's hand touches when the user grabs the handle of the fuel injection hole cap or when the user grabs near the handle. In this state, when the user touches the handle of the fuel injection hole cap when lubricating the fuel, the user touches the static electricity discharger, so the static electricity accumulated in the body discharges through the handle of the fuel injection hole cap or the static electricity discharger buried under the surface of the handle of the fuel injection hole cap and to the vehicle body, so that any possibilities for fire or explosion due to the occurrence of static electricity may be completely prevented even when the fuel evaporation gas is present inside of the fuel injection hole when the fuel injection hole cap is opened, thus securing safe and reliable fueling work. In addition to the simple discharging function of the static electricity, the present invention has features in that it is possible to visually check the discharged state by turning on/off the lighting device when the static electricity is being discharged, so the self-fueling user may have psychologically stable mind in the middle of fueling, which may lead to the promotion of self-fueling business.

BRIEF DESCRIPTION OF THE DRAWINGS

The present invention will become better understood with reference to the accompanying drawings which are given only by way of illustration and thus are not limitative of the present invention, wherein.

MODES FOR CARRYING OUT THE INVENTION

Figure 1:
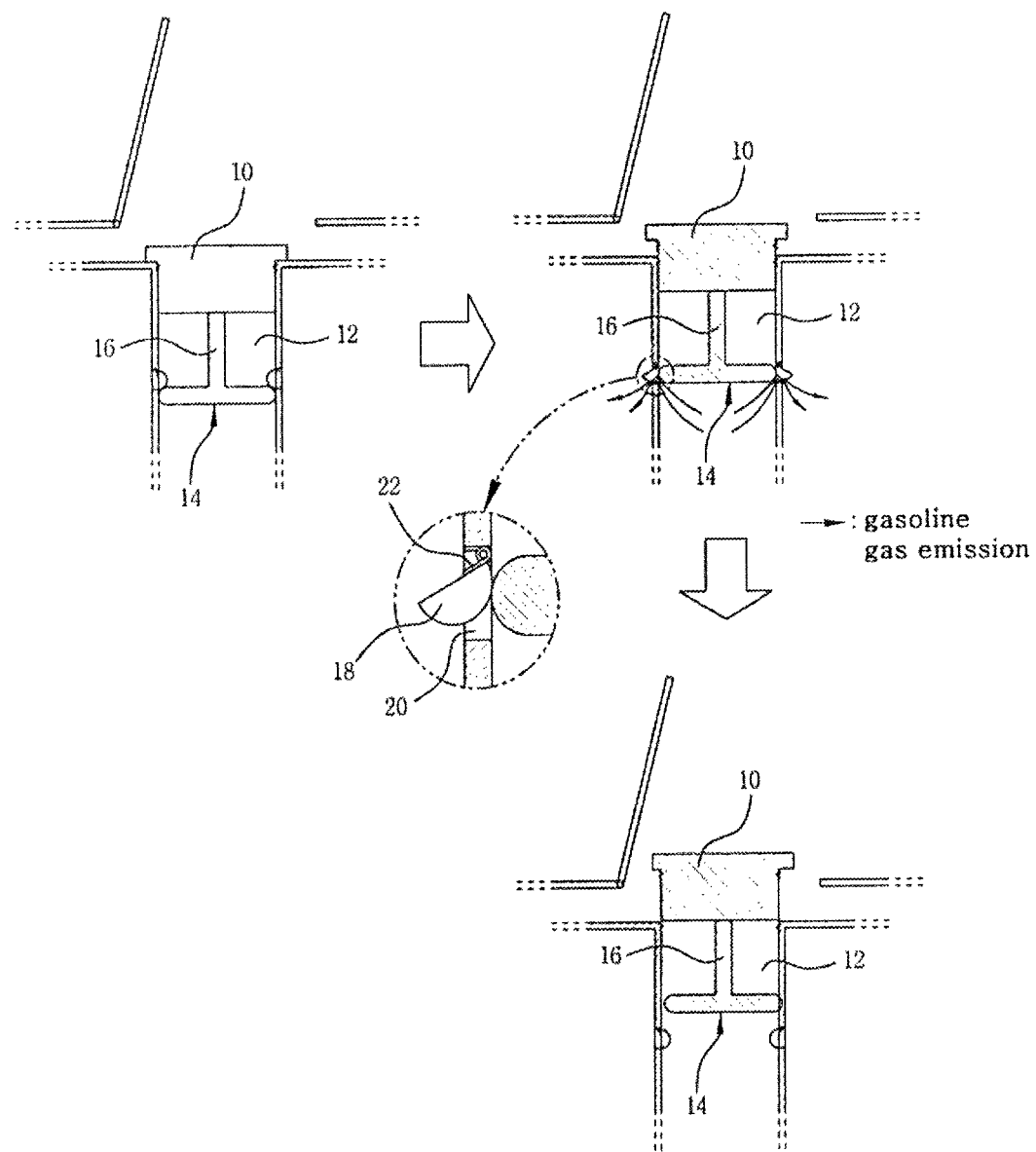
FIG. 1 is a view illustrating a method of the prior art wherein fuel evaporation gas is discharged and treated so as to prevent ignition and explosion of fuel evaporation gas due to static electricity.

For the sake of the full understanding of the present invention, the exemplary embodiment of the present invention will be described with reference to the accompanying drawings. The exemplary embodiments of the present invention may be modified into various forms, and it should not be interpreted that the scope of the present invention is limited by the following descriptions. The exemplary embodiments of the present invention are provided for the sake of enough descriptions to a person having ordinary skill in the art. Therefore, the shapes, etc. of components in the drawings may be a little exaggerated for emphasizing the clearer descriptions. It is noted that the same components in the drawings are given the same reference numbers. Any known functions or configuration which are considered as making unclear the gist of the present invention may be omitted from the descriptions.

The explosion prevention fuel injection hole cap due to static electricity according to the exemplary embodiments of the present invention will be described with reference to the accompanying drawings.

Figure 3:
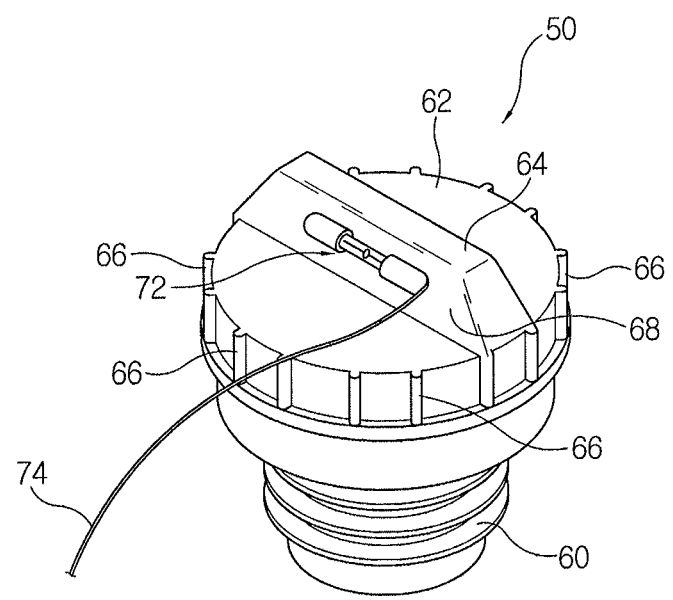
FIG. 3 is a view illustrating an explosion prevention fuel injection hole cap which explosion may occur because of static electricity.
Figure 4:
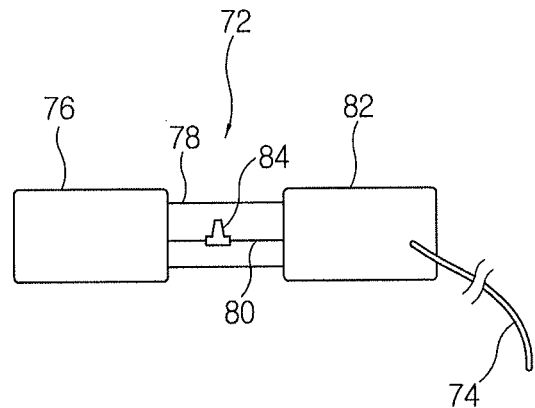
FIG. 4 is a view illustrating a static electricity discharger according to the present invention.
Figure 5:
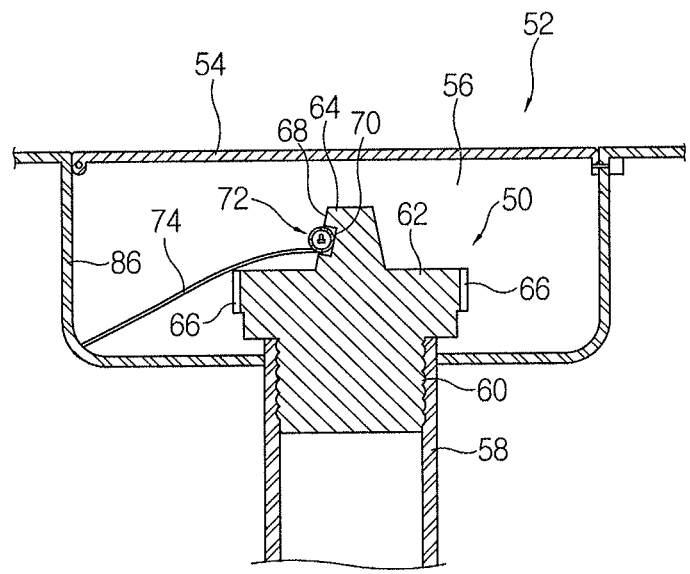
FIG. 5 is a view illustrating a state wherein an explosion prevention fuel injection hole cap due to static electricity is installed at a fuel injection hole formed at a side of a vehicle.

FIG. 3 is a view illustrating an explosion prevention fuel injection hole cap which explosion may occur because of static electricity, and FIG. 4 is a view illustrating a static electricity discharger according to the present invention, and FIG. 5 is a view illustrating a state wherein an explosion prevention fuel injection hole cap due to static electricity is installed at a fuel injection hole formed at a side of a vehicle.

In the drawings, the explosion prevention fuel injection hole cap due to static electricity according to the present invention is given a reference number of 50. The explosion prevention fuel injection hole rap 50 due to static electricity (hereinafter referred to as fuel injection hole cap) is provided, wherein a fuel injection hole cap protection compartment 56 opened and closed by a fueling door 54 is formed at a fuel injection unit 52 disposed at a side of a vehicle, and an open end thereof connected to a fuel tank is engaged through a screw 60 to an open end of a pipe-shaped fuel injection hole 58 extending from the fuel injection hole cap protection compartment 56.

The fuel injection hole cap 50 of the present invention is made in a plastic injection way, and a straight line-shaped handle unit 64 integrally protrudes from a head unit 62 thereof, and a plurality of slipping prevention protrusions 66 are formed along a circumferential side of the head unit 62 so as to easily apply rotational force by preventing any slipping.

In addition, a concave groove 70 is formed at either side of the handle unit 64, namely, at a side surface unit 68 with which a user's finger contacts. As illustrated in FIG. 3, a static electricity discharger 72 is inserted in the concave groove 3. Here, the static electricity discharger 72 may be any structure which is available in the market, but different from the structure available in the market, a metallic ground wire 74 which is electrically conductive, extends long like a tail of an animal. When the static electricity discharger 72 is engaged at the concave groove 70, part of the body of the static electricity discharger 72 is buried within the concave groove 70, and the rest of the body thereof protrudes from the side surface unit 68 of the handle unit 64, so that the exposed part of the body can contacts with the user's finger when the user grabs with the hand so as to open the fuel injection hole cap 50.

Figure 2:
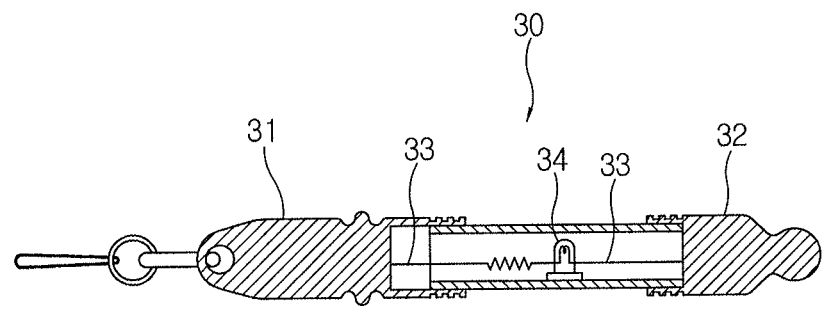
FIG. 2 is a view illustrating a conventional portable static electricity discharger that a user can carry with him, who worries about the occurrence of static electricity.

As described along with FIG. 2, the static electricity discharger 72 may include a static electricity discharge circuit contact unit 76 made from a metal, a visible or invisible pipe unit 78 made from glass or plastic, a conductive wire 80, a metallic conductive unit 82 and a lighting unit 84 which is made using a diode, etc. and is connected at an intermediate portion of the conductive wire 80 which is wired through the pipe unit 78. The ground wire 74 extends from the metallic conductive unit 82, and the ground wire 74 is made from an elastic metallic wire which is electrically conductive. In a state where the fuel injection hole cap 50 as illustrated in FIG. 5 is engaged to the fuel injection hole 58 by using a screw, a free end of the ground wire 74 extends long while keeping contacted with a vehicle body panel 86.

The process for removing static electricity when the user uses the fuel injection hole cap 50 according to the present invention will be described.

A driver who wants to fuel into his vehicle parks by an island of a gas pump and activates a switch for opening a fueling door 54 and gets out of the vehicle and grabs with a hand the handle unit 64 so as to open the fuel injection hole cap 50 and rotates in the opening direction.

At this time, the instant that the user's hand grabs the handle unit 64 before the fuel injection hole cap 50 is rotated, the current of any static electricity of high voltage (the intensity of current is weak, but voltage is high) flows through the static electricity discharge circuit contact unit 76, the conductive wire 80, the metallic conductive unit 82, the ground wire 74 and the vehicle body panel 86, thus being discharged, and while the current of the static electricity flows through the conductive wire 80, the lighting unit 84 is turned on with a flash, so seeing the flash of the lighting unit 84, the user recognizes that the static electricity is discharged from his body and performs a fueling in safe.

The instant that the user's hand contacts with the fuel injection hole cap 50, the static electricity of the user's body is discharged. The fuel injection hole cap 50 is rotated more, thus disengaging the thread-engaged state. When the fuel injection hole cap 50 is removed from the fuel injection hole 58, the fuel evaporation gas (oil vapor) generating inside of the fuel tank is discharged through the fuel injection hole 58 and into the fuel injection hole protection compartment 56. At this time, since the static electricity has been discharged, there may not be any danger of explosion. In the same way, even when a fueling work is performed by inserting a fuel nozzle into the fuel injection hole 58, no more dangerous explosion will not occur due to the presence of the static electricity unless there is any flammable thing which may cause explosion.

Therefore, when the fuel injection hole cap 50 for the discharge of static electricity according to the present invention is installed, the discharging may be automatically performed through the handle unit of the fuel injection hole cap which the user should necessarily contact in the middle of the fueling work without any measure or operation for removing static electricity or any worries about the presence of static electricity. In particular, the user may visually recognize the discharged state of the static electricity by seeing the flash which is caused by the current of the discharging, thus securing safety and user's psychological stability. In particular, even though the self-fueling system is providing the user with lower gas cost advantages, a big accident has occurred due to static electricity, which is making the user worry about any accident, thus causing some difficulties in propagating and activating the uses of the self-fueling gas station. However, the present invention makes it possible to prevent any accident due to static electricity in the middle of fueling, thus promoting the propagation of the cheap self-fueling gas station.

As described above, the exemplary embodiments of the present invention have been described, which is the best mode known to the inventor when performing the present invention. It is obvious to a person having ordinary skill in the art that such exemplary embodiments may be implemented from the above descriptions. The inventor may expect that a person having ordinary skill in the art may expect such modification (for example, it is expected that the static electricity discharger may be installed at an outer circumferential portion of the head unit of the fuel injection hole cap, wherein the static electricity discharger is configured to let the user visually recognize the discharging of the static electricity through the flashing in case of the fuel injection hole cap wherein the surface of the fuel injection hole cap or the handle unit does not protrude, which is near the portion to which the user's finger touches when the user grabs the protruding handle. The inventors may implement other features which are not disclosed in the above descriptions. The invention may include the features disclosed in the claims and other equivalents within an allowable range of related laws. It is should be interpreted that all possible combinations of the above-described components also belong to the scope of the present invention unless otherwise stated.

What is claimed is:

1. A fuel injection hole cap for preventing explosion due to static electricity, which opens and closes a fuel injection hole for injecting fuel into a fuel tank of a vehicle, comprising:
   a handle unit which is configured to pop up above a surface of vehicle body for rotating open the fuel injection hole cap;
   a static electricity discharger a part of a body of which is buried in order for the static electricity accumulated in a user's body to flow and be discharged when a user's hand touches at least a surface of the handle unit; and
   an ground wire which extends from the static electricity discharger in order for the current of the static electricity flowing from the user's body and the static electricity discharger to be guided to a vehicle body panel and to be discharged, wherein a free end thereof keeps contacted with a vehicle body panel of a fuel injection hole cap protection compartment, and
   wherein the static electricity discharger comprises:
   a visible pipe unit through which light passes;
   a static electricity discharge circuit contact unit and a metallic conductive unit which cover both ends of the visible pipe unit; and
   a lighting unit which is disposed inside of the visible pipe unit and is configured to instantly flash by the current of the static electricity so that the user can visually recognize the discharged state when the current static electricity flows to the ground wire when the user touches the handle unit and contacts the static electricity discharge circuit contact unit.

2. The cap of claim 1, wherein the ground wine is made from an elastic metallic wire.

* * * * *